Aug. 3, 1965 L. W. GUTH ETAL 3,198,443
SUPPORT SYSTEM FOR A FOOD WASTE DISPOSER
Filed June 17, 1963 2 Sheets-Sheet 1
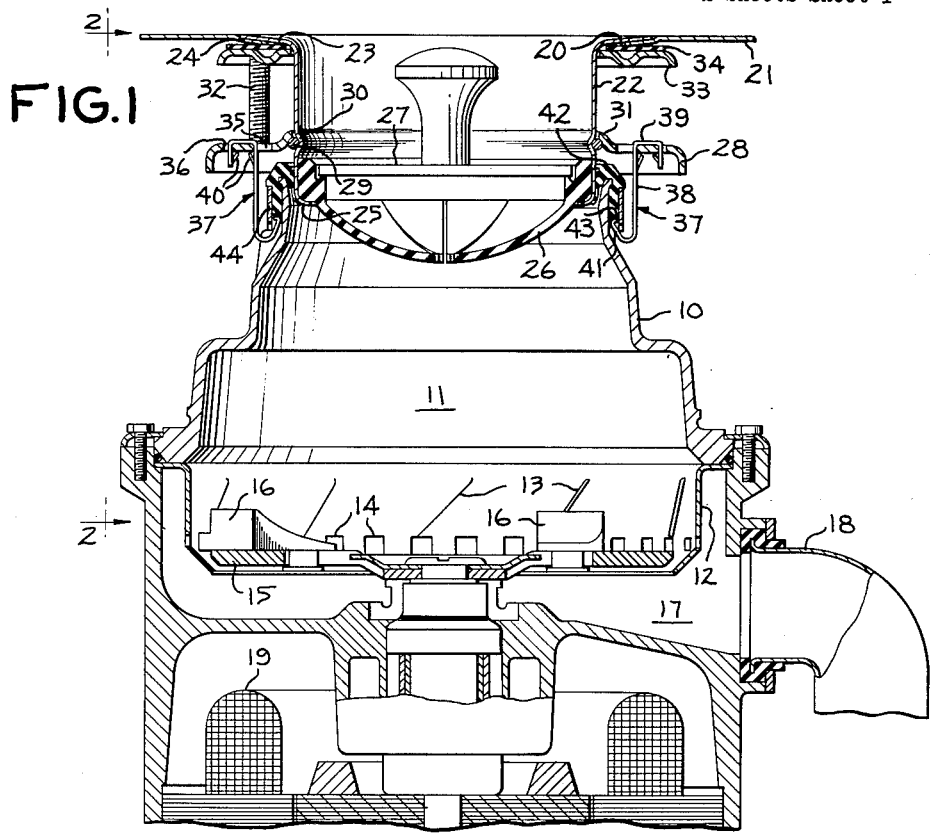
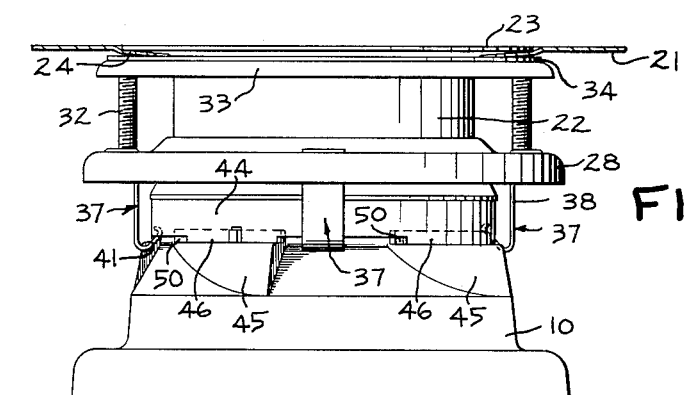
INVENTORS
LAUREN W. GUTH
& HARRY W. THURMAN
BY *Sheridan & Biggs*
THEIR ATTORNEY Aug. 3, 1965 L. W. GUTH ETAL 3,198,443
SUPPORT SYSTEM FOR A FOOD WASTE DISPOSER
Filed June 17, 1963 2 Sheets-Sheet 2

INVENTORS
LAUREN W. GUTH
& HARRY W. THURMAN
BY
THEIR ATTORNEY

United States Patent Office

3,198,443
Patented Aug. 3, 1965

3,198,443
SUPPORT SYSTEM FOR A FOOD WASTE
DISPOSER
Lauren W. Guth, Louisville, and Harry W. Thurman, Fern Creek, Ky., assignors to General Electric Company, a corporation of New York
Filed June 17, 1963, Ser. No. 288,391
7 Claims. (Cl. 241—100.5)

This invention relates generally to food waste disposers and, more particularly, to an improved means to support a food waste disposer from a sink flange.

Food waste disposers are most commonly supported from, and in communication with, the drain opening of a kitchen sink which opening serves as an ingress opening for the admission of the waste material and water to the comminuting apparatus. As a result, the disposer itself is most often positioned in a relatively inaccessible location, viz., within the cabinet below the sink. This makes the installation and removal of the disposer an awkward chore, especially if the disposer is a relatively heavy one. In the past, it often required the efforts of two workmen to properly install or remove a disposer from its location beneath the kitchen sink. This was especially true, if the support system of the disposer involved an arrangement wherein it was necessary to manually hold the disposer in position while separate connecting means were screwed or snapped into supporting position.

Accordingly, it is an object of the present invention to provide an improved means to support a food waste disposer from a sink.

It is another object of this invention to provide a support means which easily allows a single workman to install or remove a food waste disposer.

It is another object of this invention to provide a support means which affords quick installation or removal of a food waste disposer with respect to the sink.

Briefly stated, in accordance with one aspect of the present invention, support means for a food waste disposer having a hopper or housing is provided and includes a plurality of clips suspended from a sink with each clip having an upwardly turned free end. A member extending from the housing has a surface adapted to rest upon the free ends of the clips to secure the housing in its normal installed position. A plurality of cams are provided on the outer surface of the housing and are adapted to cooperate with the aforementioned clips to bias the clips out of engagement with the aforementioned surface upon rotation of the housing whereby the housing may be lowered and disconnected from the sink.

While the specification concludes with claims particularly pointing out and distinctly claiming the subject matter which is regarded as the invention, it is believed the invention will be better understood from the following description taken in connection with the accompanying drawings, in which:

Figure 3:
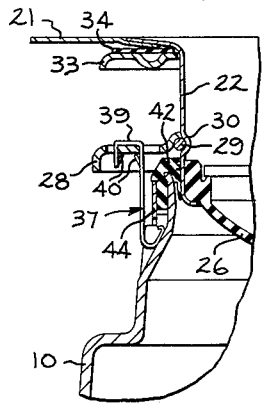
FIGURE 3 is a partial sectional view of the disposer of FIGURE 1 wherein the disposer has been moved slightly upwardly.
Figure 4:
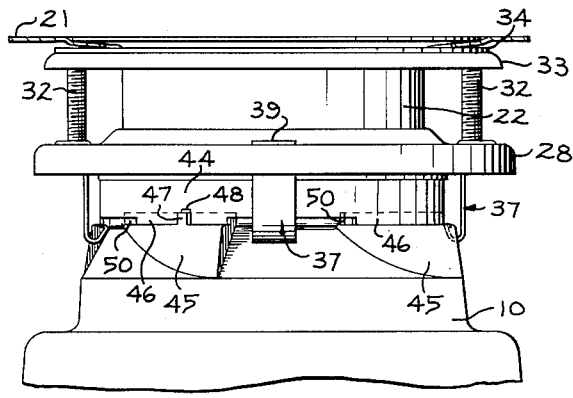
FIGURE 4 is a partial elevational view showing the disposer in the position of FIGURE 3.
Figure 5:
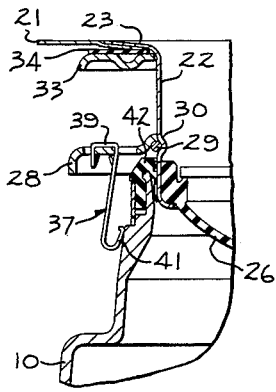
FIGURE 5 is a partial sectional view of the disposer of FIGURE 1 wherein the disposer has been rotated a FIGURE 6 is a partial elevational view showing the disposer in the position of FIGURE 5.
Figure 6:
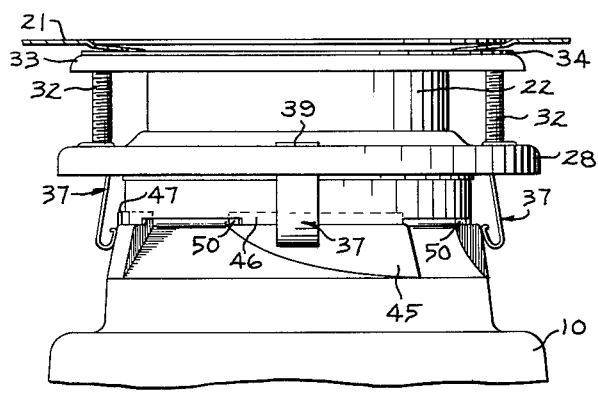
Figure 7:
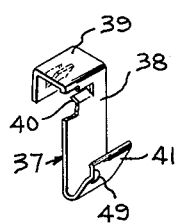
FIGURE 7 is a perspective view of one of the clips of the present invention showing details thereof.
Figure 4:
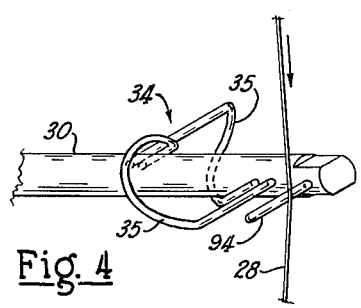
Figure 3:
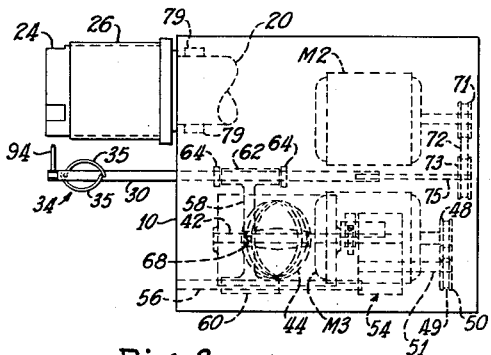
Figure 1:
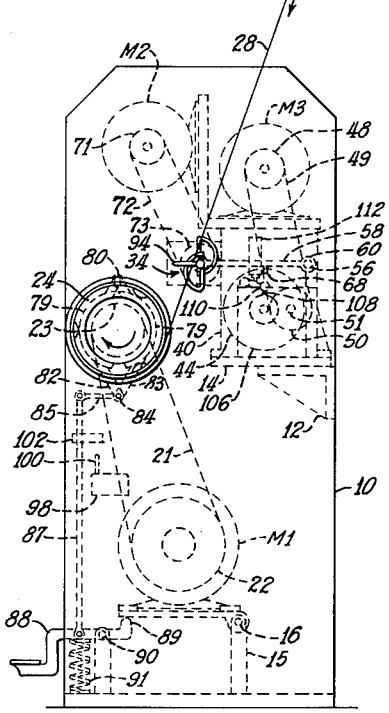
FIGURE 1 is a partial sectional view of a food waste disposer employing the present invention with the disposer shown in its normal installed position.
Figure 2:
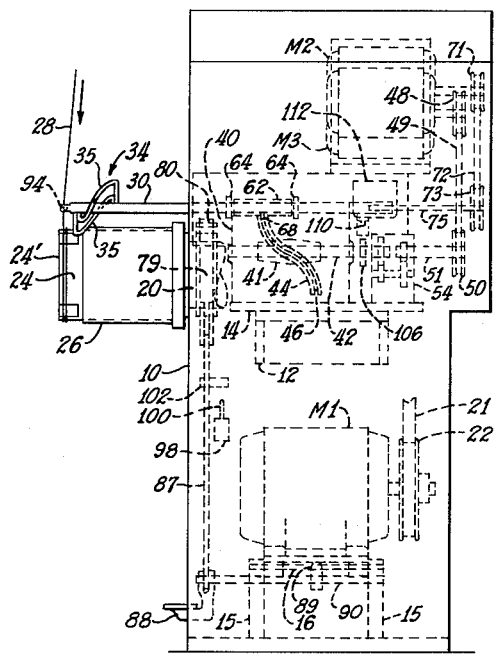
FIGURE 2 is a partial elevational view of the disposer of FIGURE 1 also shown with the disposer in its normal installed position.

Referring now to the drawings, and particularly to FIGURES 1 and 2, there is shown a food waste disposer having a generally cylindrical hopper or housing 10 enclosing a comminuting chamber 11 near the bottom of which the comminuting or shredding of waste material takes place. Any suitable comminuting means may be used to effect the comminuting operation. For example, the comminuting means may be used which is described and claimed in United States Patent No. 2,828,083, issued March 25, 1958 to H. J. Macemon, and assigned to the General Electric Company, the assignee of the present invention. Briefly, the comminuting means comprises a stationary shredding ring 12 which is provided with cutting surfaces 13 and with a plurality of apertures 14. Coacting with the shredding ring 12 is a material impelling flywheel 15 which is provided with impellers 16 arranged, upon rotation of the flywheel, to impel the waste material against the shredding ring 12 to comminute the material into a fine mass. It will be understood that during this operation water will be caused to flow down through the housing 10, and that eventually the water and the comminuted material constituting a flowable mass will be impelled outwardly through the apertures 14 into a drain chamber 17 which communicates with a drain line 18 leading to the sewer system of the house. The flywheel 15 is driven by a suitable electric motor 19.

The upper end of the housing 10 includes an opening through which the waste material and the water is supplied to the housing 10 from a drain opening 20 provided in the household sink, the bottom wall of the sink being designated by the numeral 21. The means arranged in accordance with this invention for supporting the disposer from the wall 21 comprises a cylindrically tubular sleeve 22 which is arranged to be inserted down through the drain opening 20 and at its upper end is provided with an outwardly extending annular flange 23 adapted to overlie an annular marginal edge 24 of the drain opening 20. Preferably, and as shown in the drawing, the marginal edge 24 is slightly depressed from the bottom wall 21. The lower end of the sleeve 22 is provided with an inturned flange 25 which is adapted to support a splash guard 26. The splash guard 26 is, in turn, adapted to support a suitable sink stopper 27.

The sleeve 22 not only functions to conduct the waste material and water into the housing 10 but also constitutes a support means for the housing 10. For the purpose of supporting the disposer, the sleeve 22 is rigidly secured to the bottom wall 21 of the sink. This is accomplished by a support ring 28 which encircles the sleeve 22 and cooperates with a snap ring 29. The snap ring 29 nests in an annular recess 30 in the sleeve 22. The inner peripheral portion 31 of support ring 28 is shaped to seat upon the snap ring 29 so that as the support ring 28 tends to move downwardly, it engages snap ring 29 such that it prevents snap ring 29 from expanding while at the same time, snap ring 29 prevents downward movement of the support ring 28. Support ring 28 is provided with a plurality of spaced threaded openings each of which receive a bolt 32. The bolts 32 function to clamp the flange 23 to the marginal edge 24 of the sink by means of a clamping ring 33 encircling the sleeve, it being understood that when the bolts 32 are screwed upwardly they will sandwich the marginal edge 24 between the flange 23 on the sleeve and the clamping ring 33. Preferably, a ring gasket 34 encircling the sleeve 22 will be inserted between the bottom of the sink and the clamping ring 33.

Aug. 3, 1965  R. J. MOODY ETAL  3,198,444
METHOD AND APPARATUS FOR PACKAGING FILAMENTARY MATERIALS
Filed April 11, 1962  2 Sheets-Sheet 1

INVENTORS
RALPH J. MOODY &
BY SHERMAN T. MCLANE

ATTORNEYS